Feb. 5, 1935. ST. CLAIR LAKE ET AL 1,990,236
LIQUID LEVEL INDICATOR
Filed Jan. 25, 1934
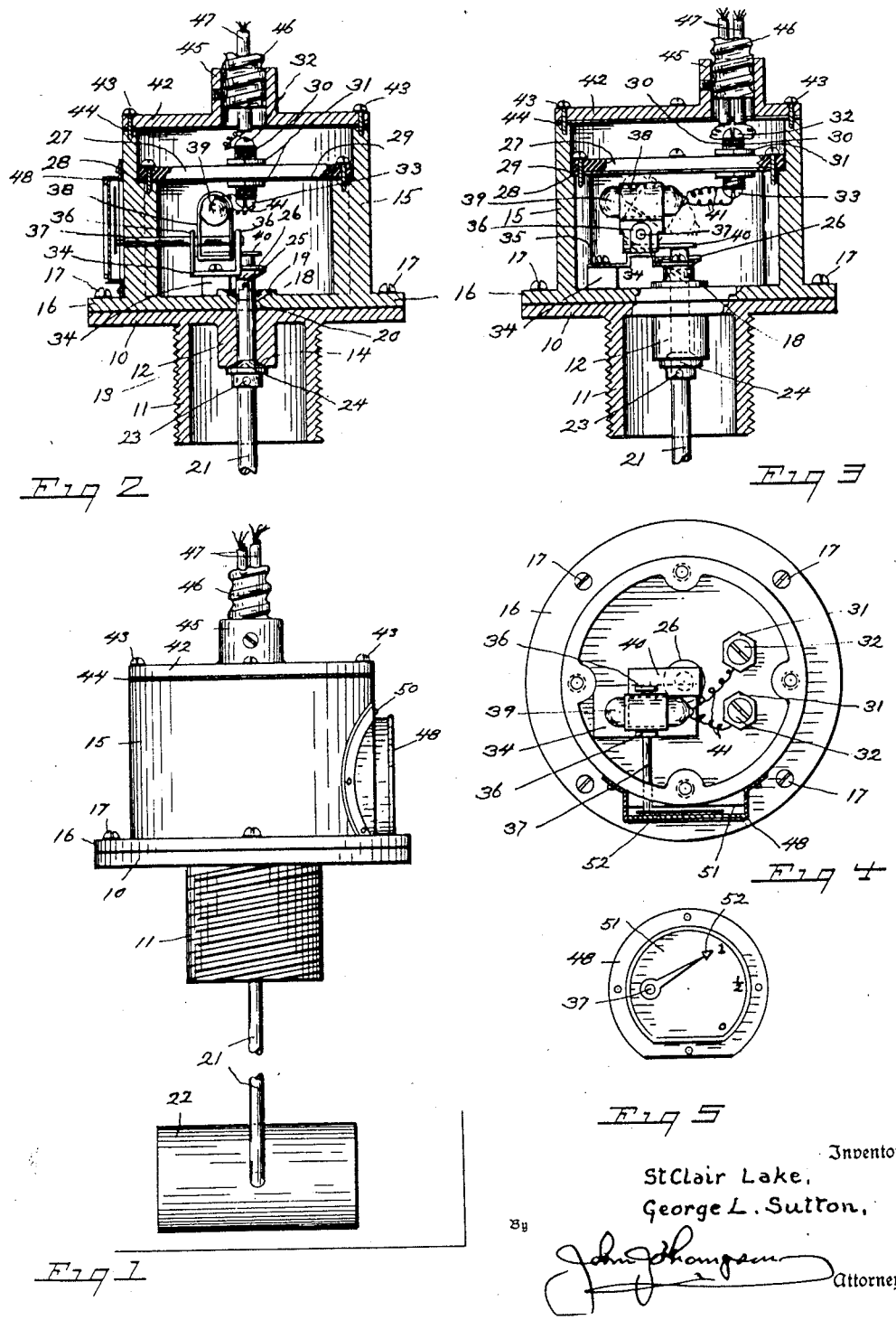
Inventors
StClair Lake,
George L. Sutton,
By
Attorney Patented Feb. 5, 1935

1,990,236

UNITED STATES PATENT OFFICE 1,990,236

LIQUID LEVEL INDICATOR

St Clair Lake and George L. Sutton, Poughkeepsie, N. Y.

Application January 25, 1934, Serial No. 708,173

2 Claims. (Cl. 200—84)

This invention relates to a liquid level indicator of that class which is intended for attachment to a liquid storage tank, such as fuel oil tanks which may be located either below or above the ground.

The object of the invention is to provide a novel liquid level indicator capable of being attached to the tank, and operated by a float located within the tank, and which when it reaches a predetermined low level will operate an electric switch to close a circuit and either light a lamp or excite a buzzer that may be located in some convenient place at a distance from the tank.

Most of the fuel oil tanks now in use for heating purposes are only provided with a sight feed mounted directly upon the tank, or the amount of oil remaining in the tank has to be measured by inserting a rod into the filler pipe, thus requiring that they must be inspected either in the cellar or outside of the installation.

With our present invention which may be attached to the tank and have either a lamp or buzzer located in a room of the house, the low oil level will be indicated in an automatic manner.

Also we have provided the device with a dial indicator which also shows the position of the float.

With these and other objects in view, our invention consists in certain novel construction and combination of parts that will hereinafter be fully described and claimed and illustrated in the accompanying drawing which forms a part hereof and in which like figures of reference refer to corresponding parts in all of the views, and it is understood that slight changes may be made without departing from the spirit of the invention.

In the drawing:

Figure 1 shows a side elevation of the device and the float for operating the same.

Figure 2 shows a vertical sectional view, showing the parts in a normal position with the electrical circuit open.

Figure 3 is a similar sectional view, taken at a right angle to that shown in Figure 2, and indicates in dotted lines the position of the switch when the circuit is closed.

Figure 4 is a top view of the device with the cover plate removed, and the dial indicator shown in section.

Figure 5 is a front view of the dial indicator.

Referring to the drawing:

The device comprises a two part casing of metal or other suitable material and which are here shown as of tubular design but which may be of any desired shape and size.

The lower part 10 is formed with a depending portion 11 provided with the external threads for attachment to the usual fitting which is secured to the tank, and within this portion 11 is a concentric boss 12 having an axial bore 13 and formed with a valve seat 14 on the lower end thereof.

The upper part of the casing 15 is formed with a flange 16 adapted to be secured to the portion 10 by the screws 17 and is also formed with an axial boss 18 having a valve seat 19 and a bore 20 which registers with the bore 13, and within said bores 13 and 20 is slidably mounted the upper part of the float rod 21 which has its lower end attached to the float 22, in such a manner that the float may be turned upright to allow of its being inserted into the tank through the fitting to which the depending portion 11 is secured.

Upon said rod 21 below the valve seat 19 is secured by the pin 23 a valve member 24, and also upon the rod 21 above the valve seat 14 is secured by the pin 25 a valve member 26; the movement of the rod 21 being slight and by the closing of either of the valves all gas and fumes are prevented from entering the switch chamber in the upper part 15.

The upper part of the casing 15 is divided into a switch chamber and a terminal chamber by a plate 27 of insulating material which is mounted by the screws upon a shoulder 28 formed in the casing 15, and the joint may be rendered air tight by the packing 29; and in this plate 27 are mounted two terminals 30 which are formed with the threads for the locking screws 31, while the ends are provided with the binding screws 32 and 33.

Upon two bosses 34 formed in the bottom of the casing 15 is mounted a support 34 by the screws 35, and upon this support is formed the two ears 36 which have bearings for a transverse shaft 37, which has free rotatable action therein.

A switch clamp 38 within which is mounted the mercury tube 39 is secured upon the shaft 37 in a rigid manner, and the base of said clamp 38 is provided with an arm 40 which is located directly above the end of the rod 21 which is in contact therewith, the tube 39 being in the position shown in Figure 3, when the electrical circuit is open, and shown in dotted lines when the rod 21 is lowered by the float and the mercury runs to the lowered end of the tube 39 closing the circuit.

The leads 41 from the tube 39 being secured to the binding screws 33.

The upper part of the casing 15 is closed by a cover plate 42 secured thereto by the screws 43 and having a gasket 44.

This cover plate is formed with a boss 45 located adjacent to the terminals 30 and has a bore in said boss within which is mounted the end of the electrical conduit 46 which carries the feed wires 47 which are attached to the binding screws 32.

While the opening for the electrical conduit 46 is here shown as being in the cover plate 42 it is understood that this may be formed in the side of the casing 15 if so desired; and that the feed wires 47 may be carried to either an electric lamp or a buzzer located where desired and connected into a source of electrical current.

For providing as well, a sight indicating means, we have provided a dial indicator comprising a casing 48 secured to the outside of the casing 15 by the pins 50 and provided with a graduated dial 51 over the face of which moves a hand 52 which is secured upon the end of the shaft 37 which extends through the casing 15, and it will be seen that as the rod 21 moves down the hand will indicate the amount of liquid remaining in the tank.

As the float is of the submerged type, when the liquid in the tank is above the float the upward pressure upon the float and rod 21 will keep the lower valve closed tightly, and when the tank is empty and the float is in its lowest position the weight of the float will tend to keep the upper valve closed.

Having thus described our invention, what we claim as new and desire to secure by Letters Patent, is:

1. In a float operated liquid level indicator the combination with a tank having a float mounted therein, and a casing secured to said tank and formed with a switch chamber, of a support mounted in said switch chamber and formed with transverse bearings, a shaft mounted in said bearings and having one end extending through the side of said casing, a mercury switch mounted on said shaft and connected in an electrical circuit, a dial indicator mounted on said casing and provided with an indicating hand secured upon the end of said shaft, and means operated by said float for tilting said switch to close the electrical circuit and move the indicating hand over the indicator dial.

2. A liquid level indicator for tanks having a float, comprising a casing having means for attachment to the tank and formed with an axial bearing and divided into an upper and a lower chamber by a tight wall, said bearing formed with an upper and a lower valve seat, a rod slidably mounted in said bearing and having its lower end attached to the float, a pair of valve members mounted on said rod and adapted to limit the movement of said rod and to close either of said valve seats by said movement, a mercury switch tiltably mounted in the lower chamber and adapted to be tilted by the movement of said rod, electrical terminals mounted in the dividing wall and connected both to the switch and a current supply entering said casing, a dial indicator mounted on said casing and having an indicating hand operated by the tilting of the switch.

ST CLAIR LAKE.
GEORGE L. SUTTON.